APPARATUS FOR HANDLING AND STORING STRIP MEDIA

Filed July 5, 1960

3 Sheets-Sheet 1

INVENTOR.
HENRY RAY WARREN
BY
Morris A. Rabkin
ATTORNEY

Oct. 8, 1963 H. R. WARREN 3,106,355

APPARATUS FOR HANDLING AND STORING STRIP MEDIA

Filed July 5, 1960 3 Sheets-Sheet 2

INVENTOR.
HENRY RAY WARREN
BY Morris A. Rabkin
ATTORNEY

Oct. 8, 1963 H. R. WARREN 3,106,355

APPARATUS FOR HANDLING AND STORING STRIP MEDIA

Filed July 5, 1960 3 Sheets-Sheet 3

INVENTOR.
HENRY RAY WARREN
BY Morris Rabkin
ATTORNEY

United States Patent Office 3,106,355

Patented Oct. 8, 1963

3,106,355

APPARATUS FOR HANDLING AND STORING STRIP MEDIA

Henry Ray Warren, Haddonfield, N.J., assignor to Radio Corporation of America, a corporation of Delaware Filed July 5, 1960, Ser. No. 40,660
17 Claims. (Cl. 242—55.01)

The present invention relates to apparatus for handling and storing strip media, and more particularly to apparatus for handling and storing strip media, such as films, magnetic tape records and the like.

In electronic data processing apparatus and other data handling apparatus, it is desirable to incorporate facilities having storage for a great deal of information. These facilities also desirably should provide for rapid access to specified data therein so that stored data may be retrieved or replaced by other data within a very short period of time. Magnetic drums have been used to provide such information storage facilities. Magnetic drum systems tend to be expensive and are generally difficult to maintain. It is desirable, in many instances, to use magnetic tape devices instead of magnetic drums because of the relatively low cost and flexibility of application of magnetic tape.

It has been suggested to use, in data storage systems, mechanisms for handling and storing long magnetic tape records in the form of loops. Such apparatus has not been entirely satisfactory. Some tape loop handling and storage mechanisms require a large amount of space in order to provide capacity for handling and storing a requisite amount of information.

In tape loop handling and storage mechanisms wherein a tape is formed into a plurality of successive loops in order to conserve space, it has not been feasible to drive the tape at sufficiently high speed to provide the desired rapid access to specified information. The relatively slow tape speeds found necessary heretofore may be attributed to windage or air friction which makes tape guiding and driving difficult and which may also distort the shape of the tape at the signal transducing head. Where the tape is distorted at the head, it is generally not possible to properly translate the signals onto and from the tape during recording and reproducing operations.

Another factor which militates against high speed of tape travel in mechanisms for driving tape formed into continuous successive loops is slippage between adjacent loop turns in the arcuate portions of the loops. Since the tape is not smooth and is usually coated with an abrasive magnetic oxide, friction between the loop turns may cause binding among the successive loops of the tape. Friction may even generate enough heat to melt, or at least deleteriously soften, the tape.

In tape systems for electronic data processing apparatus, it is often necessary to accelerate the tape to high speeds very rapidly in order to begin data reading and writing without delay. The tape must also stop quickly in order to accurately locate any desired data thereon. In other words, the tape system must have rapid start-stop characteristics. Rapid start-stop characteristics were obtained in prior tape systems by providing, adjacent a tape driving capstan, slack lengths of tape which could be accelerated rapidly. While the operation of tape systems using slack lengths of tape has been generally satisfactory, additional equipment is required in order to always maintain a requisite amount of slack tape. The space required for a slack length of tape also gives rise to problems when it is desirable to make the tape system more compact.

It is an object of the present invention to provide improved apparatus for handling elongated strip media providing storage for a large amount of information and rapid access to any portion of such information.

It is a further object of the present invention to provide improved tape storage apparatus for handling and storing information, which apparatus is readily manufacturable at low cost.

It is a still further object of the present invention to provide improved facilities for storage of a large amount of information in a minimum of space.

It is a still further object of the present invention to provide improved apparatus for handling and storing elongated strip media in the form of successive loops wherein a larger number of loops can be accommodated and wherein the media can be driven at higher speeds than in known apparatus of this type.

It is a still further object of the present invention to provide improved apparatus for storing and handling tape in the form of successive loops wherein wearing of the tape is minimized.

It is a still further object of the present invention to provide improved apparatus for handling and storing tape in the form of successive loops wherein the adverse affects of air friction are eliminated.

It is a still further object of the present invention to provide improved apparatus for automatically regulating the tension in an elongated strip medium when said medium is driven along any prescribed path.

It is a still further object of the present invention to provide improved tape handling apparatus having rapid start-stop characteristics.

Briefly described, the invention includes an elongated strip medium, such as a tape, arranged in a plurality of successive, substantially concentric overlapping loops. These loops have arcuate segments in which slippage of the loops relative to each other takes place. Means are associated with the arcuate segments of each loop to establish layers of a fluid medium for providing substantially frictionless bearings upon which the tape floats.

In accordance with a feature of the invention, the tape in the reaches of essentially all of the loops, between the arcuate segments thereof, is in overlapping relation. Tape in adjacent reaches is also in contact. The contacting, coextensive reaches of the tape loops present a relatively small surface to the ambient air so that the adverse effects of the air friction are substantially eliminated.

In accordance with another feature of the invention, apparatus may be provided for automatically regulating the tension in tape. This apparatus includes means for defining a layer of fluid medium upon which the tape floats. A mechanism responsive to the pressure of the fluid medium in the layer controls tension in the tape so as to establish a desired pressure in the layer.

A fluid medium which is desirably used in practicing the invention is a gas, such as air.

The invention itself, both as to its organization and method of operation, as well as the foregoing and other objects and advantages thereof, will become more readily apparent from a reading of the following description in connection with the accompanying drawings in which.

Figure 1:
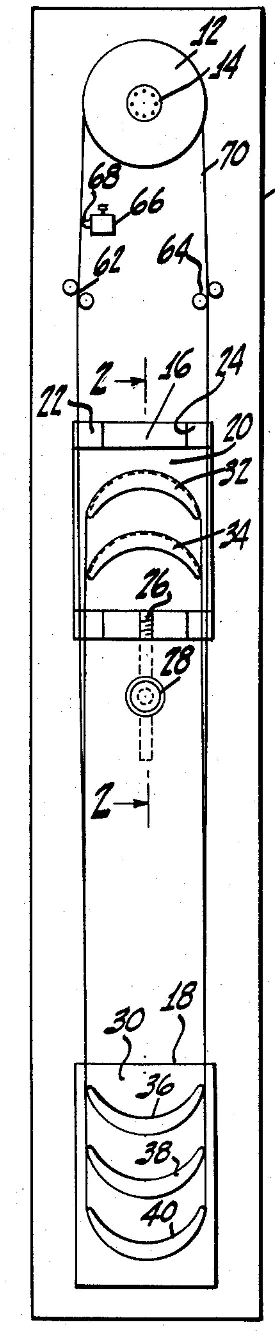
FIG. 1 is a front view schematically showing apparatus constructed in accordance with the present invention for handling and storing a magnetic tape record.
Figures 2, 2A:
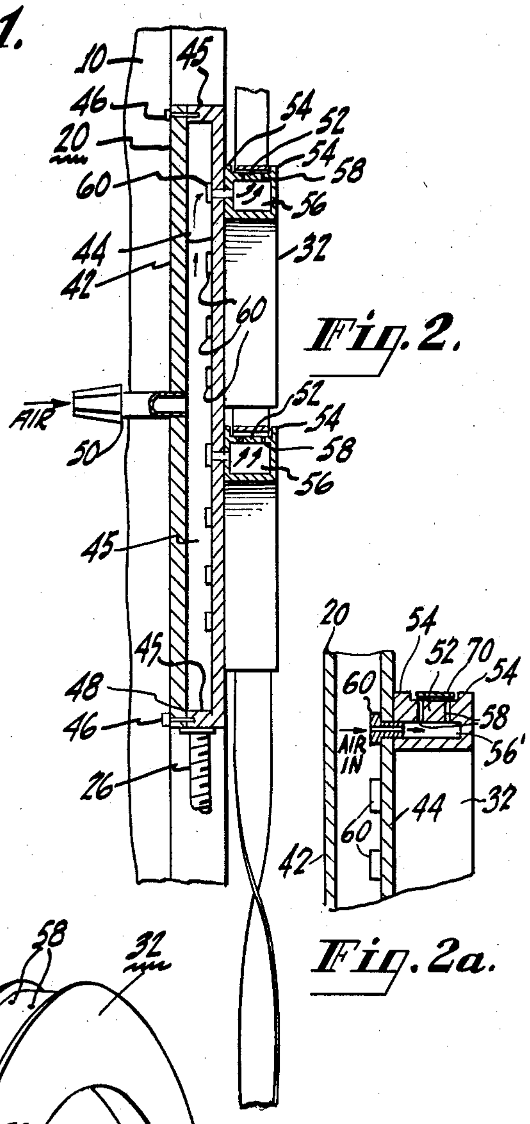
FIG. 2 is a fragmentary, enlarged sectional view of the apparatus shown in FIG. 1, the section being taken along the line 2—2 in FIG. 1.
Figure 3:
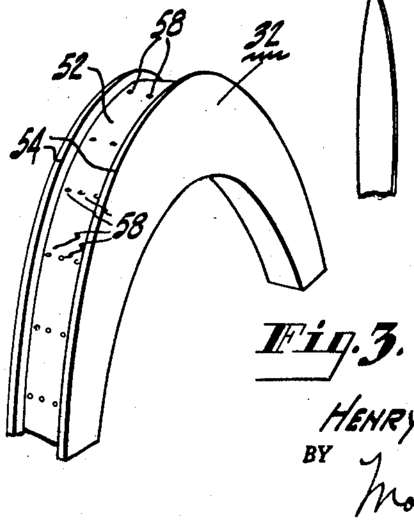
Figures 4, 5:
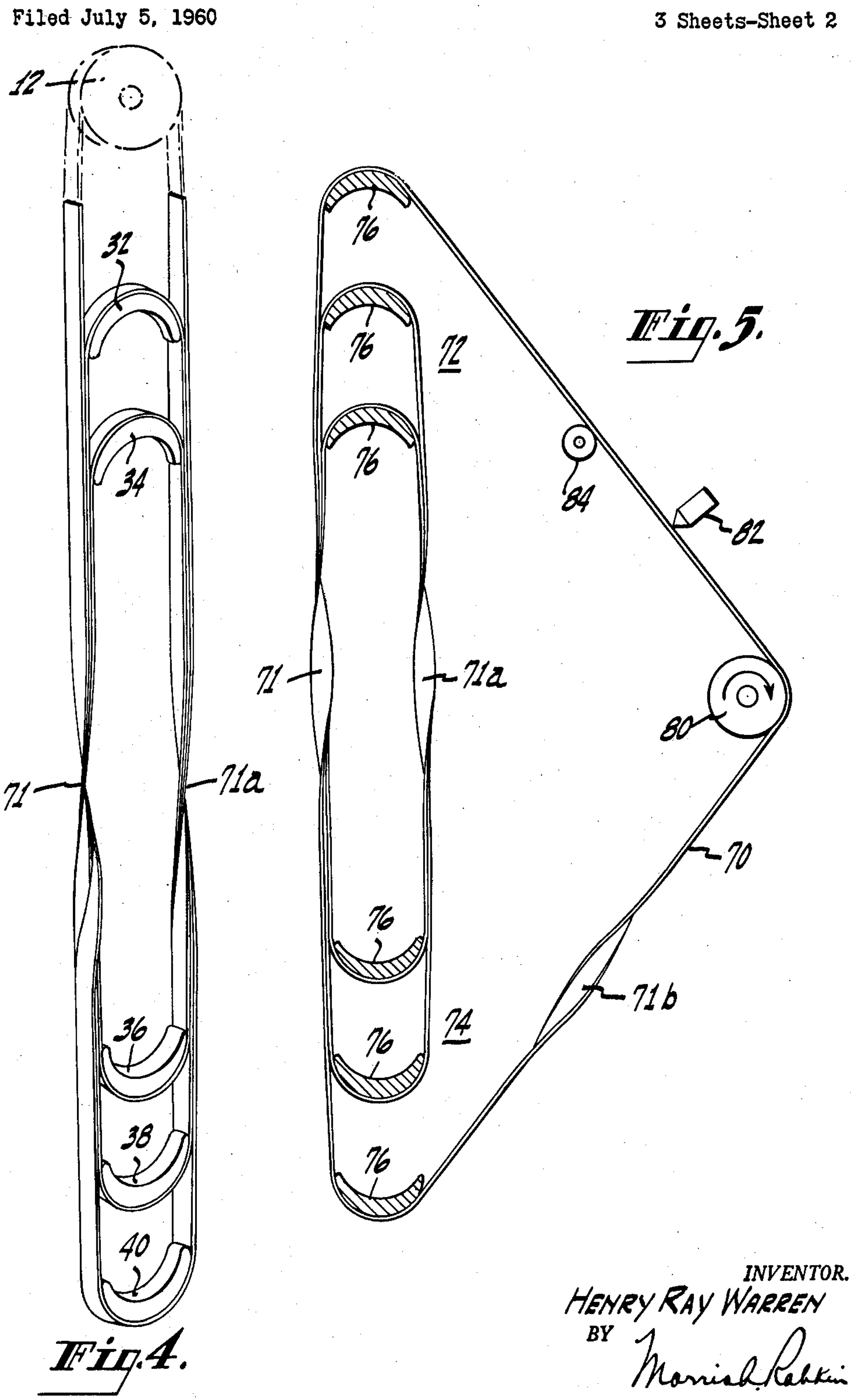
Figure 6:
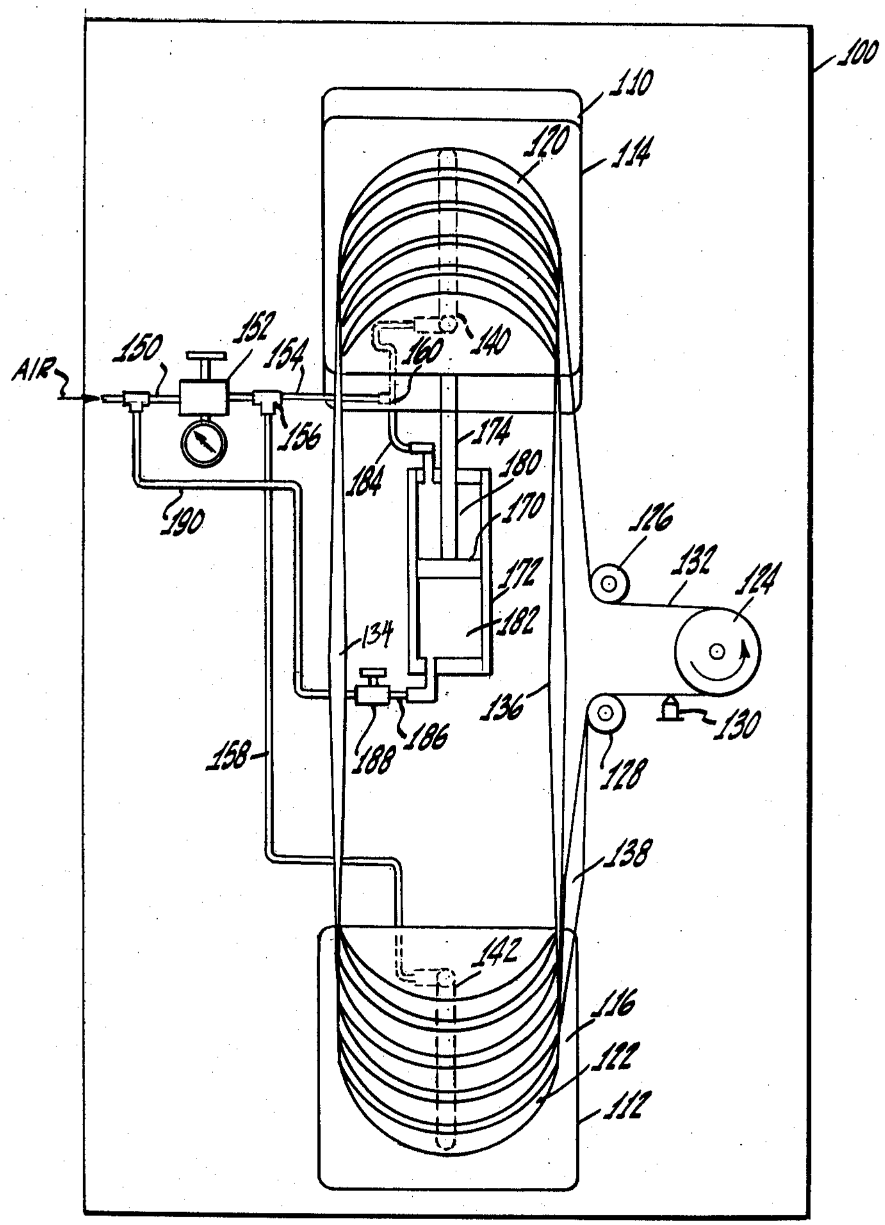

FIG. 2*a* is a view similar to FIG. 2 showing a modified form of the apparatus shown in FIG. 1;

FIG. 3 is a perspective view of one of the tape guide members illustrated in FIGS. 1 and 2;

FIG. 4 is a perspective view schematically showing the path of the tape shown in FIG. 1;

FIG. 5 is a front elevation view schematically showing apparatus for handling and storing a tape record in accordance with another embodiment of the present invention; and FIG. 6 is a front view schematically showing apparatus for handling and storing a tape record similar to the apparatus illustrated in FIG. 5, which apparatus incorporates means provided in accordance with an embodiment of the invention for automatically regulating the tension in the tape.

Referring more particularly to FIG. 1, there is shown a panel 10. A tape capstan 12 is mounted on a shaft 14. The shaft 14 extends through the panel 10 and is driven by a motor (not shown).

The panel 10 has rectangular upper and lower openings 16 and 18, respectively. An upper manifold 20 is mounted in the upper opening 16. The upper opening 16 has rails 22 and 24 on which the upper manifold 20 is slidable. A screw feed mechanism including a feed screw 26 is provided for sliding the upper manifold 20 in opposite directions, upwardly or downwardly, along the rails 22 and 24. This feed screw mechanism includes a hand wheel 28, which is manually accessible at the front of the panel, for turning the feed screw 26. A lower manifold 30 is disposed in the lower opening 18. This lower manifold 30 is fixed with respect to the upper manifold 20. Both the lower manifold 30 and the upper manifold 20 may be removed for servicing.

A pair of guide members 32 and 34 are secured to the upper manifold 20, and three guide members 36, 38 and 40 are secured to the lower manifold 30 by way of illustration. The two guide members 32 and 34 constitute one group, and the three guide members 36, 38 and 40 constitute another group of guide members. Only two guide members 32 and 34 are illustrated in the first group and three guide members 36, 38 and 40 are illustrated in the second group of guide members, solely in order to simplify the illustration. A much larger number of guide members may be used. For example, about nine guide members may be disposed on the upper manifold 20, and ten guide members may be disposed on the lower manifold 30. One more guide member is included in the group of guide members disposed on the lower manifold 30 than is in the group of guide members disposed on the upper manifold 20 so as to properly define the tape path in cooperation with the capstan 12, as will become more readily apparent from the description which follows. One or more additional sets of two groups of guide members supported on additonal upper and lower manifolds may be disposed adjacent to the manifolds 20 and 30, if desired. Such additional sets of groups of guide members and manifolds may be used to increase the capacity of the apparatus for storage of tape.

The construction of the manifolds and guide members is shown in greater detail in FIGS. 2 and 3. The manifold 20 is illustrated as including a back plate 42 and a front plate 44. The front plate has four sides 45 (only two being shown in FIG. 2). The back plate 42 may be fastened to the sides 45 of the front plate 44 by means of screws 46. A gasket (not shown) may be inserted between the sides 45 of the front plate 44 and the periphery of the back plate 42.

A coupling or connector 50 extends through the back plate 42 into the opening defined between the front and back plates 44 and 42. The manifold 20 is illustrated as including one chamber. However, the manifold may be divided into three distinct, vertically disposed chambers. Each chamber may be connected to a common connector or coupling so as to afford means for connection to a common fluid medium supply.

A source of a fluid medium under pressure is coupled to the coupling 50 on the manifold 20. This source is a source of compressed air in accordance with this illustrative embodiment of the present invention and is indicated "AIR" on the drawings with an arrow showing direction of air flow.

The guide members 32 and 34 are illustrated as having tape guiding surfaces 52 between flange-like appendages 54. The tape guiding surfaces 52 are arcuate in shape. The arc of surfaces 52, in accordance with a preferred embodiment of the invention, in each case corresponds to a semi-circle. However other analogous arcuate shapes may be used. The guide members 32, 34, 36, 38 and 40, as a whole, are of crescent shape.

Each of the crescent shaped guide members 32, 34, 36, 38 and 40 has an opening 56 therein. A plurality of orifices 58 extend from the openings 56 to the guiding surfaces 52 in each of the guide members 32, 34, 36, 38 and 40.

The guide members are fastened to the front plate 44 of the manifold 20 by means of screws 60. Each screw 60 has a bore extending axially therethrough so as to communicate the openings 56 with the chamber in the manifolds. While the openings 56 are illustrated as being hollows formed in the guide members, it may be desired to construct the guide members, as shown in FIG. 2*a*, by drilling a plurality of holes 56', one for each of the screws 60. The orifices 58 may be drilled from the arcuate surface 52 into these holes. In such a case, the opening 56 or 56' will be effectively constituted of a plurality of openings, one for each of the screws 60.

The guide members 32, 34, 36, 38 and 40 are all disposed in aligned relation along the line bisecting the semicircular arcs defined by the guiding surfaces 52 thereof and transversely to this line. The guiding surfaces of the members 32 and 34 on the upper manifold 20 face in one direction (up) along the bisecting line, while the guiding surfaces of the guide members 36, 38 and 40 in the group of guide members on the lower manifold 30 fact in opposite direction (down).

In addition to the capstan and guide members 32, 34, 36, 38 and 40, there are also mounted on the panel 10 a first pair of cylindrical guide members 62 and a second pair of cylindrical guide members 64. These cylindrical guide members 62 and 64 are conventional flanged guide members which are often used in magnetic tape transport systems. A magnetic head mount 66 is disposed between the first set of cylindrical guide members 62 and the capstan 12. A magnetic head 68 is held in this mount 66. This magnetic head may be a multi-track head of a type often used in electronic data processing equipment. The head 68 may be connected to electronic input-output apparatus for the purpose of recording and reproducing information on a magnetic tape record 70 which is illustrated as being disposed for cooperation with the magnetic head 68. The tape 70 is adapted to travel along the path including the plurality of successive loops around the guide members 32, 34, 36, 38 and 40 and the capstan 12.

The path of the tape is illustrated in FIG. 4 of the drawings. The tape path extends from around the capstan 12 (shown in phantom in FIG. 4) downwardly to the outermost of the guide members 40 in the group of guide members on the lower manifold 30. The tape executes a half twist 71 (180°) between the capstan 12 and the lower guide member 40. This half twist is executed in the reach of the loop between the upper group of guide members and lower group of guide members. The surface of the tape 70 which is coated with retentive magnetic material, such as a magnetic oxide, is disposed on the side of the tape facing the capstan 12. This is the surface of the tape scanned by the magnetic head 68, as the tape travels downwardly from the capstan to the lowermost of the guide members 40. After passing around the lowermost guide member 40, the tape path extends upwardly. The tape executes another half twist **71*a* (180°) and passes around the innermost guide member 34** of the upper group of guide members. The tape then proceeds downwardly and around the middle guide member 38 which is disposed next to the outermost guide member 40 of the bottom group of guide members. The tape executes another half twist 71 between the guide member 34 and the guide member 38. From the guide member 38, the tape passes around the outermost guide member 32 of the upper group of guide members. The tape also executes another half twist 71a between the guide member 38 and the guide member 32. After passing around the guide member 32, the tape executes still another half twist 71 and passes around the innermost, lower guide member 36. From the innermost guide member 36, the tape returns to the capstan 12 after first having executed another half twist 71a. Thus, it wil be observed the tape path is from the outermost guide member of the lower group to the innermost guide member of the upper group and then to the next outermost and next innermost guide members of the lower and upper groups, respectively. The half twists in the tape between the upper and lower groups of guide members permit the tape to essentially "peel-off" the contiguous reach portions of the loops into and out of the various guide members. After the tape executes its first twist 71 and before it passes around the lower guide member 40, it overlaps the tape in the reaches extending between guide members 32 and 36 and 34 and 38. The tape is fed from the capstan into the outside of the loop rather than from the inside of the loop as was the case with prior, continuous loop, tape storage apparatus. It will be appreciated, however, that other tape loop arrangements can be provided which use the features of the invention.

In operation the source of compressed air is connected to the coupling 50 so that air under pressure is applied to the manifold. In a typical system, a pressure of 15 pounds per square inch may be suitable. The air flows through the manifold into the openings 56 in the guide members 32, 34, 36, 38 and 40, and through the openings in the screw 60, as illustrated in FIG. 2 of the drawings. The air is exhausted through the orifices 58. A layer of air constituting an air bearing is formed between the tape and the guiding surfaces 52 of the guide members 32, 34, 36, 38 and 40. Thus, the arcuate portions of the successive loops of the tape 70, where slippage normally occurs between adjacent loops, are floated on substantially frictionless bearings of air.

It will be noted further that the tape loops are coextensive and travel together in the reaches thereof between the groups of guide members disposed on the upper manifold 20 and the lower manifold 30. These reaches of the loops will travel together, since the tape moves at the same linear speed at all points thereof. This reduces the air friction or windage effects which are prevalent when a tape medium moves at high speeds. Accordingly, the tape may be driven by the capstan at very high speed, since the adverse effects of slippage and windage are substantially eliminated. A suitable speed at which the tape can be driven may be approximately 2500 inches per second. It may be desirable, under some circumstances, to drive the tape at a speed of 5,000 inches per second where very rapid access to information stored on the tape is desirable. The capacity of the tape storage system is also large and, as was pointed out above, many more guide members may be used in each of the groups of guide members than are illustrated in FIG. 1 of the drawings. Also, as pointed out above, additional sets of groups of guide members may be used so as to further increase the tape storage capacity of the system.

Referring to FIG. 5 of the drawings, another embodiment of a tape handling and storage apparatus in accordance with the invention is schematically illustrated. This apparatus differs from the apparatus shown in FIGS. 1 to 4 in that it includes a first group of guide members 72 and the second group of guide members 74 each having the same number of guide members 76.

The apparatus illustrated in FIG. 5 includes a capstan 80, a magnetic head 82, and a conventional, cylindrical tape guide member 84. The capstan may rotate in a clockwise direction, as illustrated by the arrow thereon. The coated surface of the tape is disposed on the outside of the capstan, as illustrated, so as to be scanned by the head 82. The tape travels along a path extending from the outermost of the guide members 76 in the lower group of guide members 74 to the innermost of the guide members 76 in the upper group of guide members 72. The tape then passes around the next to the outermost of the guide members in the lower group 74 and the next to innermost of the guide members in the upper group 72. Finally, the tape passes around the innermost of the guide members in the lower group 74 and the outermost of the guide members in the upper group 72. The tape then proceeds around the capstan 80 to form an endless band. A half twist 71b occurs in the tape between the capstan 80 and the outermost of the guide members 76 in the lower group of guide members 74, in addition to the half twists 71 and 71a in the reaches of each of the loops between the guide members in the upper and lower ones of the groups 72 and 74. The tape does not twist between the outermost of the guide members in the upper group 72 and the capstan 80. The twist in the reaches of each of the loops between the upper group of guide members 72 and lower group of guide members 74 provides for feeding of the tape into and out of the outermost ones of the guide members 76. The additional twist 71b between the outermost guide member in the lower group 74 and the capstan 80 is to provide for the desired position of the coated surface of the tape adjacent the head 82, when the tape passes the head 82 after successively executing loops between the guide members 76. It will be observed that the requisite number of half twists is provided also in the apparatus illustrated in FIGS. 1 to 4.

Rapid start-stop characteristics are obtainable with apparatus provided by the invention such as is illustrated in FIGS. 1 to 5. Since the tape 70 is normally floated on layers of air over the crescent shaped guides, the capstan only need accelerate or stop a mass equal substantially to the weight of the tape alone. It is not necessary to rotate bodies having large masses such as reels and the like which would inhibit the acceleration or the deceleration of the tape. Since the weight of the tape is very small, the tape will accelerate and decelerate almost instantaneously with the acceleration and deceleration of the capstan for driving the tape.

Referring to FIG. 6 of the drawings, an apparatus is shown for storing and handling an elongated tape record somewhat similar to the apparatus illustrated schematically in FIG. 5 of the drawings. This system includes a panel 100 having openings 110 and 112 therein. Manifolds 114 and 116 are disposed, respectively, in the openings 110 and 112. The manifold 114 is slidable vertically in the opening 110 as was the case for the manifold 20 in FIG. 1 of the drawings, while the manifold 116 may be fixed. A plurality of crescent shape guide members 120 similar to those described above are arranged in nested relationship in a first group on the upper manifold 114. A plurality of similar guide members 122 are arranged in nested relationship on the lower one of the manifolds 116. The guide members in the upper group have tape guiding surfaces which face upwardly, while the guide members in the lower group have tape guiding surfaces which face downwardly. A tape driving capstan 124 is provided. Cyclindrical guide rollers 126 and 128 are arranged, respectively, above and below the capstan 124. A magnetic head 130 is disposed between the capstan and the guide member 128. This head may be similar to the head 66 shown in FIG. 1, and connected to associated electronic apparatus. The capstan may be driven in a counter-clockwise direction so that the tape 132 is pulled over the head 130, as is conventional.

The tape 132 executes a plurality of successive loops around the guide members 120 and 122, the tape executing a half twist (180°) in the reaches of each of the loops. These half twists 134 and 136 in FIG. 6 correspond respectively to half twists 71 and 71*a* of FIG. 5. The tape executes another half twist 138 (corresponding to half twist 71*b* of FIG. 5) between lowermost of the guide members 122 and the cylindrical guide roller 128 in FIG. 6.

A supply of compressed air is connected to the apparatus by way of a system of piping. This piping ultimately connects to a chamber 140 in the upper manifold 114 and a chamber 142 in the lower manifold 116. These chambers may be similar to the chambers shown in FIG. 2. Air flows from the air supply (not shown) into a pipe 150. This pipe 150 is connected to a flow regulator valve 152. This flow regulator valve may be of any suitable, conventional type. The flow regulator valve 152 is connected to an output pipe 154. This output pipe 154 connects through a T-coupling 156 with another pipe 158. The pipe 158 is connected to the chamber 142 on the fixed manifold 116. The output pipe 154 is also connected via a T-coupling 160 to the chamber 140 in the moveable manifold 114. Air is supplied through the manifolds 114 and 116 to the guide members 120 and 122 for the purpose of providing layers of air for floating the arcuate segments of the loops on air bearings, as was explained heretofore in connection with FIGS. 1 to 5.

In order to regulate, automatically, the tension in each loop of the tape 132 a system including a piston 170 is provided. This piston 170 is moveable in a cylinder 172 and is connected to the moveable manifold 114 by a connecting rod 174. The piston 170 divides the cylinder 172 into two compartments, namely, a fore compartment 180 and an aft compartment 182. A pipe 184 is connected from the T-coupling 160 to a port in the fore compartment 180 of the cylinder 172. The aft compartment 182 is connected through a port therein to an input pipe 186. The input pipe 186 is connected to a pressure regulator valve 188. This valve 188 may be of suitable conventional design. The regulator valve 188 is connected via a pipe 190 to the source of air through the pipe 150. The pressure regulator valve of 188 is desirably adjusted so that the pressure in the rear compartment 182 will be slightly less than the pressure in the manifold chamber 140.

The piston and cylinder arrangement serves to move the manifold 114 and, therefore, the guide members 120 so as to automatically regulate the tension in the tape loops. Each of the guide members 120 includes a plurality of orifices, such as the orifices 58 in the guiding surface of the guide member shown in FIG. 3. As the tension in the tape loops increases, the tape moves closer to the guiding surfaces. These orifices are thus effectively partly closed off, thus increasing the pressure in the openings 56 (see also FIG. 2) in the guide members. This pressure is reflected as a back pressure which is exerted on the surface of the piston facing the fore compartment 180. The pressures in the fore and aft compartments 180 and 182 are adjusted so that the piston 170 is in a position corresponding to the position of the manifold 114 and guide members 120 which create the desired tension in the tape. However, when the tension in the tape increases, a differential in pressures is established between the pressure in the fore compartment 180 and the pressure in the aft compartment 182. The piston 170 therefore moves into the aft compartment until the air in the aft compartment is compressed so as to establish an equilibrium of pressures in the fore and aft compartments 180 and 182. When the tape guide members move downwardly, the orifices may be unblocked to an extent which decreases the pressure in the air bearing in the openings 56 in the guide members (see FIG. 2), and in the fore compartment 180 of the cylinder. The piston 170 then moves in the opposite direction until the tape tension is properly established.

When the tension in the tape loops decreases, the system operates in the same manner as if the guide members were to move downwardly, that is, the guide members 120 move up and tend to maintain the tension in the tape constant.

It is desirable to use a differential pressure system, as illustrated in FIG. 6. However, in the interest of economy, it may be desired to replace the rear piston with a spring. A differential air pressure system is preferred, however, since the force exerted in the aft compartment will always correspond to the distance traveled by the piston 170. In addition, the differential air pressure system automatically releases the tension of the tape when the air supply is cut off.

The automatic tension regulating system is more desirable than electromechanical, servo tape tension regulators which have been suggested in the past. The pneumatic, automatic tension regulator illustrated in FIG. 6, as a preferred embodiment thereof, is readily adaptable for use with the previously described devices.

From the foregoing description, it will be apparent that there has been provided improved apparatus for handling elongated strip media, such as magnetic tape records, and for automatically adjusting the tension in such elongated strip media. While the invention has been described in an endless loop tape system in accordance with a preferred embodiment thereof, it will be apparent that the invention may be utilized generally in other apparatus. Accordingly, it is desired that the foregoing be considered merely as illustrative and not in any limiting sense.

What is claimed is:

1. Apparatus for handling an elongated strip medium which comprises means defining a path for a plurality of successive substantially concentric overlapping loops of said medium, succeeding ones of said overlapping loops being radially displaced, each of said overlapping loops having arcuate segments, and means for establishing a bearing of a fluid medium for supporting each of said loops in said arcuate segments thereof.

2. Apparatus for handling a tape medium which comprises a plurality of tape guide members defining a path for a plurality of successive substantially concentric overlapping loops of said tape around said members, succeeding ones of said overlapping loops being radially displaced, each of said loops having arcuate segments, and means including said members for establishing a gaseous bearing for supporting each of said loops in said arcuate segments thereof.

3. In apparatus for handling a tape medium including a capstan for driving said tape, the combination which comprises a plurality of tape guide members defining a path for a plurality of successive, substantially concentric overlapping and coextensive loops of said tape, succeeding ones of said overlapping loops being radially displaced, each of said loops having arcuate segments around said members, and means for establishing gaseous bearings between said guide members and said tape for substantially frictionlessly guiding each of said loops.

4. In apparatus for handling a tape medium arranged in a plurality of successive substantially concentric overlapping loops each having arcuate segments at opposite ends thereof and reaches extending substantially between said arcuate segments, succeeding ones of said overlapping loops being radially displaced, the combination comprising means for supporting each of said loops individually with adjacent ones of said loops in contact with each other in the reaches thereof, and means for floating said arcuate segments of each of said loops individually on layers of a fluid medium.

5. In apparatus for handling a tape medium arranged in a plurality of continuous, successive and substantially concentric overlapping loops each having arcuate segments at opposite ends thereof and reaches extending substantially along straight lines between said arcuate segments, succeeding ones of said overlapping loops being radially displaced, the combination comprising means for driving said tape at a linear velocity whereby said arcuate segments of said tape in adjacent ones of said loops slip with respect to each other and said reaches of said tape in adjacent ones of said loops move together at constant velocity, and means for floating said arcuate segments of said tape in each of said loops individually on layers of air.

6. In apparatus for handling an elongated tape medium arranged in a plurality of successive substantially concentric overlapping oblong loops each having arcuate segments at opposite ends thereof and reaches extending substantially along straight lines between said arcuate segments, succeeding ones of said overlapping loops being radially displaced, the combination comprising a panel, a pair of manifolds on said panel, said manifolds being spaced from each other, a plurality of tape guide members mounted on each of said manifolds for supporting said arcuate segments of said loops, each loop being supported by a pair of said guide members, one being disposed on one of said manifolds and the other being disposed on the other of said manifolds, said loops being coextensive and in contact with each other in the reaches thereof which extend between said guide members on different ones of said manifolds, each of said guide members having a plurality of orifices communicating with the one of said manifolds on which it is disposed, and means for flowing air into said manifolds whereby said arcuate segments of each of said loops can be floated on a layer of air.

7. Apparatus for storing an elongated strip medium which comprises a plurality of guide members each having an arcuate surface for guiding said medium, said guide members being disposed separately in different ones of two spaced groups, said guide members in each of said groups being arranged successively in spaced relation to each other, said guiding surfaces of said guide members in one of said groups facing in one direction, said guiding surfaces of said guide members in the other of said groups facing in a direction opposite to said one direction, said guide members in each of said groups being spaced from each other a sufficient distance to receive a segment of said medium therebetween whereby said medium is adapted to be threaded in successive substantially concentric overlapping loops each around said guiding surface of a different one of said guide members in one of said groups and said guiding surface of a different one of said guide members in the other of said groups, succeeding ones of said overlapping loops being radially displaced, and means including said guide members for establishing layers of air between said medium and said guiding surfaces.

8. Apparatus for storing an elongated tape medium which comprises a plurality of crescent shaped guide members each having an arcuate tape guiding surface, said guide members being disposed separately in different ones of two spaced groups, said guide members in each of said groups being disposed in nested relationship with each other, said guiding surfaces of said guide members in one of said groups facing in one direction, said guiding surfaces of said guide members in the other of said groups facing in a direction opposite to said one direction, said guide members in each of said groups being spaced from each other a sufficient distance to receive a segment of said tape medium therebetween, said tape medium being threaded in loops around said guiding surface of the outermost of said guide members in one of said groups and said guiding surface of the innermost of said guide members in the other of said groups and successively in loops around the guiding surfaces of the next outermost and next innermost of said members in said one group and said other group, respectively, and means including said guide members for establishing gaseous bearings between said tape medium and said guiding surfaces.

9. Apparatus for storing magnetic tape records which comprises a plurality of crescent shaped guide members each having a semi-circular tape guiding surface, said guide members being disposed along a line which bisects said guiding surfaces thereof, said guide members being disposed separately in different ones of two groups, said groups being spaced from each other along said line, said guiding surfaces of said guide members in one of said groups facing in one direction, said guiding surfaces of said guide members in the other of said groups facing in a direction opposite to said one direction, said guide members in each of said groups being spaced from each other a sufficient distance to receive a segment of said tape therebetween whereby said tape is adapted to be threaded spirally and in successive loops each around the guiding surface of a different one of said guide members in one of said groups and said guiding surface of a different one of said guide members in the other of said groups, each of said guide members having a plurality of orifices therein extending through said guiding surface thereof, and means expelling air through said orifices of all of said guide members to provide layers of air between said tape and said guiding surfaces.

10. Apparatus for handling a tape medium which comprises a moveable tape guide member having a guiding surface, said surface having an opening therein, means for tensioning said tape about said member, means for flowing air under pressure through said opening in said surface to create a layer of air between said surface and said tape, and means responsive to the pressure of said air against said surface for moving said guide member to regulate said tension in said tape.

11. In apparatus for handling a tape medium, the combination which comprises a moveable member having a surface for guiding said tape, said member also having an opening therein and orifices extending from said opening through said surface, means for flowing air under pressure into said opening whereby to create flow of air through said orifices and a film of air between said surface and said tape, and means communicating with said opening mechanically coupled to said member responsive to the air pressure in said opening for moving said member to regulate the tension in said tape.

12. Apparatus for handling a tape medium in the form of a loop which comprises a pair of guide members, one of said members being moveable, said tape medium loop being disposed around said guide members under tension, said one member having an opening therein and orifices therethrough communicating with said opening, means for flowing air under pressure into said opening whereby said air flows through said orifices and creates a layer of air between said tape medium loop and said one guide member, and means communicating with said opening and mechanically coupled to said one guide member responsive to the pressure of said air in said opening for moving said one guide member to regulate said tension in said tape medium loop.

13. In apparatus for handling a tape medium, the combination which comprises a moveable member for guiding said tape medium, means associated with said moveable member for flowing air through said member and establishing a layer of air between said member and said tape medium, a chamber communicating with said member for receiving said air therein, a piston moveable within said chamber in response to the pressure of said air, said piston being connected to said member and moveable therewith, and means for biasing said piston toward said tape medium.

14. In apparatus for handling tape, the combination which comprises a guide member having a surface for guiding said tape over said member, said member being moveable in opposite directions to respectively increase or decrease the tension in said tape, means associated with said guide member for creating a layer of air between said surface and said tape, means providing a chamber, a piston within said chamber and dividing said chamber into two compartments, said piston being connected to said member and moveable therewith in said opposite directions, the size of one of said compartments being increased with respect to the size of the other of said compartments when said member moves in a direction to increase the tension of said tape, means communicating said other compartment with said member so that said air providing said layer can flow into said other compartment, and means for applying air at constant pressure to said one compartment to oppose the pressure of said air in said other compartment.

15. In apparatus for handling a tape including means for defining a path of travel for said tape, the improvement comprising means for providing a fluid pressure to establish a layer of fluid contiguous to said path defining means, and mechanical movement means responsive to the pressure of said fluid against said path defining means for moving said path defining means with respect to said path and for tensioning said tape to maintain a certain pressure adjacent said path defining means.

16. In apparatus for handling a tape including means for defining a path of travel for said tape, the improvement comprising means for establishing a fluid bearing over which said tape travels contiguous to said path defining means, and mechanical movement means responsive to the pressure of said fluid in said bearing against said path defining means and mechanically coupled to said path defining means for moving said path defining means toward and away from said path and for tensioning said tape so as to maintain a certain pressure in said bearing.

17. In apparatus for handling a tape including a guide for defining a path for said tape, the improvement which comprises means for establishing a fluid bearing between said guide and said tape, and mechanical movement means responsive to the pressure of said fluid in said bearing for moving said guide with respect to said path and for tensioning said tape to maintain a certain pressure in said bearing adjacent said guide.

References Cited in the file of this patent

UNITED STATES PATENTS

| | | |
|---|---|---|
| 1,449,515 | Kucharski | Mar. 27, 1923 |
| 1,459,795 | Pavely et al. | June 26, 1923 |
| 2,624,573 | Rice | Jan. 6, 1953 |
| 2,736,106 | Offen | Feb. 28, 1956 |
| 2,908,495 | Andrews et al. | Oct. 13, 1959 |
| 2,939,700 | Enkelmann | June 7, 1960 |
| 2,945,637 | Derrick et al. | July 19, 1960 |
| 2,954,911 | Baumeister et al. | Oct. 4, 1960 |
| 2,988,294 | Neff | June 13, 1961 |

FOREIGN PATENTS

| | | |
|---|---|---|
| 1,170,504 | France | Sept. 22, 1958 |
| 169,154 | Sweden | Oct. 27, 1959 |